United States Patent
Suzawa et al.

(10) Patent No.: US 6,924,019 B2
(45) Date of Patent: Aug. 2, 2005

(54) OPTICAL RECORDING MEDIUM AND PRODUCTION METHOD THEREFOR

(75) Inventors: Kazuki Suzawa, Tokyo (JP); Mamoru Usami, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/487,300

(22) PCT Filed: Aug. 27, 2002

(86) PCT No.: PCT/JP02/08601
§ 371 (c)(1),
(2), (4) Date: Feb. 20, 2004

(65) Prior Publication Data
US 2004/0197516 A1 Oct. 7, 2004

(30) Foreign Application Priority Data
Aug. 31, 2001 (JP) ..................... 2001-264404

(51) Int. Cl.$^7$ ................................. B32B 3/02
(52) U.S. Cl. .................... 428/64.1; 428/64.4; 428/64.5; 430/270.13
(58) Field of Search .............. 428/64.1, 64.4, 428/64.5, 913; 430/270.13, 495.1, 945

(56) References Cited
U.S. PATENT DOCUMENTS

| | | | |
|---|---|---|---|
| 5,292,568 A | * 3/1994 | Tezuka et al. | 428/64.4 |
| 5,331,625 A | * 7/1994 | Mieda et al. | 369/275.1 |
| 5,470,691 A | * 11/1995 | Arai et al. | 430/273.1 |
| 6,309,726 B1 | * 10/2001 | Ono et al. | 428/64.1 |
| 2004/0081831 A1 | * 4/2004 | Shoshi et al. | 428/422.8 |

FOREIGN PATENT DOCUMENTS

| | | |
|---|---|---|
| JP | 04-149837 | 5/1992 |
| JP | 06-150379 | 5/1994 |
| JP | 07-073511 | 3/1995 |
| JP | 08-203121 | 8/1996 |
| JP | 08-235639 | 9/1996 |
| JP | 10-302309 | 11/1998 |
| JP | 11-191240 | 7/1999 |
| JP | 2001-084642 | 3/2001 |

* cited by examiner

*Primary Examiner*—Elizabeth Mulvaney
(74) *Attorney, Agent, or Firm*—Seed IP Law Group PLLC

(57) ABSTRACT

It is an object of the present invention to provide an optical recording medium wherein hardness of the surface on the incident-light side is high and warping of the optical recording medium is suppressed.

The optical recording medium according to the present invention comprises a substrate 11, a recording layer 14 provided upon the substrate 11, a light transmission layer 16 made of ultraviolet curable resin provided upon the functional layer 16, and a hard-coat layer 17 provided upon the light transmission layer 16, wherein the thickness of the light transmission layer 16 is 50 μm or greater and its pencil hardness is HB or less. Thereby, warping of the optical recording medium arising due to cure shrinkage of the ultraviolet curable resin making up the light transmission layer 16 can be effectively suppressed. Moreover, the hard-coat layer 17 is provided upon this light transmission layer 16, so the occurrence of scratches on the surface of the optical recording medium can be effectively prevented.

14 Claims, 3 Drawing Sheets

LASER

LASER

OPTICAL RECORDING MEDIUM AND PRODUCTION METHOD THEREFOR

BACKGROUND OF THE INVENTION

The present invention relates to an optical recording medium and optical recording medium manufacturing method and particularly to an optical recording medium with a thin light transmission layer and to a method of its manufacture.

DESCRIPTION OF THE PRIOR ART

In recent years, optical recording media such as the CD, DVD and the like have been widely used as recording media for recording large amounts of digital data. Typically, read-only optical recording media are formed with layers laminated in the order (starting from the incident-light side): light transmission layer (light-transmitting substrate), reflective layer, and protective layer, while recordable optical recording media are formed with layers laminated in the order (starting from the incident-light side): light transmission layer (light-transmitting substrate), recording layer, reflective layer, and protective layer. When data is read from either type of optical recording media, a laser beam set to the playback power level is shined from the side of the light transmission layer and the reflected light is detected. In addition, when data is written to a recordable optical recording medium, a laser beam set to the recording power level is shined from the side of the light transmission layer, so that its heat energy and/or light energy changes the chemical state or physical state of the recording layer depending on the data to be recorded.

FIG. 3 is a schematic cross section showing the structure of a CD-RW disc which is a typical type of optical recording medium.

As shown in FIG. 3, the CD-RW consists of a light transmission layer 1 with a thickness of approximately 1.2 mm, a first dielectric layer 2 with a thickness of 50–150 nm, a recording layer 3 with a thickness of 10–50 nm, a second dielectric layer 4 with a thickness of 20–50 nm, a reflective layer 5 with a thickness of 90–150 nm and a protective layer 6 with a thickness of 5–10 µm. In addition, a hole 7 is provided in the center of the disc. The light transmission layer 1 is typically made of polycarbonate, the recording layer 3 is made of AgInSbTe, GeSbTe or other phase-change material, the reflective layer 5 is made of an aluminum or silver alloy, and the protective layer 6 is made of acrylic resin or other ultraviolet curable resin. In addition, examples of the materials for the first and second dielectric layers 2 and 4 include $SiO_2$, $Al_2O_3$, or other metal oxides, AlN, TiN, or other nitrides, ZnS or other sulfides along with carbides or the like, which may be used alone or in mixtures.

In the fabrication of a CD-RW having this structure, first, a stamper is used to perform injection molding of the light transmission layer 1 which has a pre-groove, and next, the sputtering method is used to form, on the side of the light transmission layer 1 having the pre-groove, the first dielectric layer 2, recording layer 3, second dielectric layer 4, and reflective layer 5 in this order. Furthermore, ultraviolet curable resin is spin-coated onto the surface of the reflective layer 5 and cured to form the protective layer 6. A CD-RW consisting of the light transmission layer 1, first dielectric layer 2, recording layer 3, second dielectric layer 4, reflective layer 5, and protective layer 6 is thus fabricated.

The phase-change material that makes up the recording layer 3 has a different light transmittance in the crystalline phase than in the amorphous phase, and this property is utilized to perform the recording of digital data.

However, in recent years, attempts have been made to record large quantities of data by setting the numerical aperture (NA) of the objective lens, used to focus the laser beam used for recording and/or playback, to 0.7 or greater, e.g. roughly 0.85, and also shorten the wavelength λ of the laser beam used for recording and/or playback in order to make the focused spot diameter of the laser beam smaller and increase the recording density. When a high NA is used in this manner, the tolerance for warping or tilting of the optical recording media, namely the so-called "tilt margin" becomes smaller, so in order to secure an adequate tilt margin, it is necessary to make the light transmission layer (light-transmitting substrate) thinner. For example, in order to secure an adequate tilt margin at settings of NA=0.85 and λ=405 nm, the light transmission layer must be made thinner to a thickness of roughly 100 µm.

However, when the thickness of the light transmission layer is roughly 100 µm, a problem arises in that adequate mechanical strength cannot be secured if it is formed by injection molding of polycarbonate or the like as in the prior art.

In order to solve this problem, a method has been proposed whereby an optical recording medium with a thinner light transmission layer is fabricated by forming upon a substrate of polycarbonate or the like, a reflective layer, dielectric layer, recording layer, dielectric layer, and light transmission layer in this order. In this method, first, a stamper is used to perform injection molding of the substrate which has a pre-groove, and next, the sputtering method is used to form, on the side of the substrate having the pre-groove, the reflective layer, second dielectric layer, recording layer, and first dielectric layer in this order. Furthermore, ultraviolet curable resin is spin-coated onto the surface of the first dielectric layer and cured to form the protective layer.

With an optical recording medium fabricated in this manner, the laser beam for recording and/or playback is incident from the opposite side of the substrate, so the substrate can be made sufficiently thick. Accordingly, when this type of optical recording media is used, it is possible to use a high-NA head for optical recording media while giving the substrate sufficient mechanical strength. When using a high-NA head for optical recording media, it is possible to narrow the beam spot of the laser beam used in recording and/or playback to an extremely small size, and thus make the optical recording medium's track pitch and groove width much narrower than in the typical CD-RW described above.

However, in an optical recording medium where the light transmission layer is made as thin as roughly 100 µm and the recording/playback of data is performed by means of a high-NA head for optical recording media, there is a problem in that they are more susceptible to the effects of scratches present in the surface on the incident-light side than in conventional optical recording media.

In order to prevent the occurrence of such scratches, it is effective to make the hardness of the light transmission layer sufficiently high, but when the light transmission layer is formed using ultraviolet curable resin, the higher its hardness the greater the warping of the optical recording medium due to cure shrinkage becomes. More specifically, when ultraviolet curable resin is used to form a light transmission layer with a thickness of 50 µm or greater, if its "pencil hardness" is set to H or greater, then warping of the optical recording medium due to cure shrinkage will reach a nonnegligible level. Here, the "pencil hardness" is defined to be the hardness as measured by means of the tester method stipulated in the Japanese Industrial Standard JIS K 5400. On the other hand, if the pencil hardness of the surface on the incident-light side is set to HB or lower in such an optical recording medium, then the occurrence of scratches cannot be effectively suppressed.

SUMMARY OF THE INVENTION

Accordingly, an object of the present invention is to provide an optical recording medium and optical recording medium manufacturing method wherein the hardness of the surface on the incident-light side is high and warping of the optical recording medium is suppressed.

Another object of the present invention is to provide an optical recording medium with a thin light transmission layer, and a method of its manufacture, wherein the optical recording medium and method of its manufacture effectively prevents scratches on the incident-light surface.

The objects of the present invention are achieved by an optical recording medium comprising a substrate, a functional layer provided upon said substrate, a light transmission layer made of ultraviolet curable resin provided upon said functional layer, and a hard-coat layer provided upon said light transmission layer, wherein the optical recording medium is such that the thickness of said light transmission layer is 50 μm or greater and its pencil hardness is HB or less.

With the present invention, the thickness of the light transmission layer is 50 μm or greater and its pencil hardness is HB or less, so warping of the optical recording medium arising due to cure shrinkage of the ultraviolet curable resin making up the light transmission layer can be effectively suppressed. Moreover, a hard-coat layer is provided upon this light transmission layer, so the occurrence of scratches on the surface of the optical recording medium can be effectively prevented.

In a preferred embodiment of the present invention, the thickness of said light transmission layer is 150 μm or less.

In a further preferred embodiment of the present invention, the pencil hardness of said hard-coat layer is H or greater.

In a further preferred embodiment of the present invention, said hard-coat layer contains an inorganic powder or an organic powder.

In a further preferred embodiment of the present invention, the average grain size of said inorganic powder or organic powder is 100 nm or less.

In a further preferred embodiment of the present invention, said hard-coat layer contains at least one of a lubricant, anti-static agent, or dispersant.

In a further preferred embodiment of the present invention, the ultraviolet curable resin making up said light transmission layer has cure shrinkage of 7% or less according to the specific gravity method.

In a further preferred embodiment of the present invention, said functional layer comprises at least a recording layer containing phase-change material.

The objects of the present invention are also achieved by means of: an optical recording medium comprising a substrate, a functional layer provided upon said substrate, a light transmission layer made of ultraviolet curable resin provided upon said functional layer, and a hard-coat layer provided upon said light transmission layer, wherein the optical recording medium is such that the ultraviolet curable resin making up said light transmission layer has cure shrinkage of 7% or less according to the specific gravity method.

The objects of the present invention are also achieved by means of: an optical recording medium comprising a substrate, a functional layer provided upon said substrate, a light transmission layer made of ultraviolet curable resin provided upon said functional layer, and a hard-coat layer provided upon said light transmission layer, wherein the optical recording medium is such that said hard-coat layer contains an inorganic powder or an organic powder.

In a further preferred embodiment of the present invention, the average grain size of said inorganic powder or organic powder is 100 nm or less.

The objects of the present invention are also achieved by means of a method of manufacturing an optical recording medium comprising: a step of forming a functional layer upon a substrate, a step of forming a light transmission layer with a thickness of 50 μm or greater and a pencil hardness of HB or less by spin-coating a first ultraviolet curable resin upon said functional layer and irradiating it with ultraviolet light, and a step of forming a hard-coat layer by spin-coating a hard-coat liquid containing a second ultraviolet curable resin upon said light transmission layer and then irradiating it with ultraviolet light.

In a preferred embodiment of the present invention, the cure shrinkage of said first ultraviolet curable resin is 7% or less according to the specific gravity method.

In a further preferred embodiment of the present invention, said hard-coat liquid contains inorganic powder or organic powder with an average grain size of 100 nm or less.

DESCRIPTION OF THE PREFERRED EMBODIMENTS

Preferred embodiments of the present invention will be explained in detail with reference to the drawings.

Figure 1:
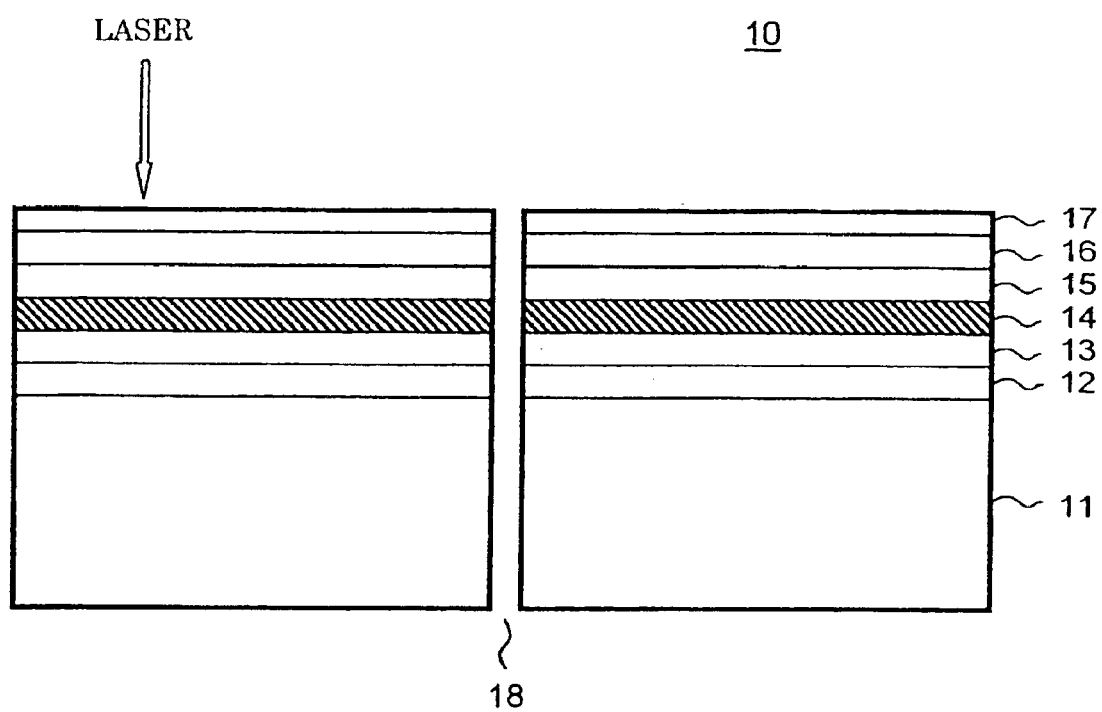
FIG. 1 is a schematic cross section of an optical recording medium 10 according to a preferred embodiment of the present invention.

FIG. 1 is a schematic cross section illustrating the structure of an optical recording medium 10 according to a preferred embodiment of the present invention.

As shown in FIG. 1, the optical recording medium 10 consists of a substrate 11 with a thickness of approximately 1.1 mm, a reflective layer 12 with a thickness of 10–300 nm, a second dielectric layer 13 with a thickness of 10–50 nm, a recording layer 14 with a thickness of 5–30 nm, a first dielectric layer 15 with a thickness of 30–300 nm, a light transmission layer 16 with a thickness of 50–150 μm, and a hard-coat layer 17 with a thickness of 0.1–10 μm. In addition, a hole 18 is provided in the center of the disc. While these are not particular limitations, the material used for the substrate 11 is preferably polycarbonate, the material used for the reflective layer 12 is preferably an alloy with silver as its main constituent, the material used for the second dielectric layer 13 is preferably $Al_2O_3$, the material used for the recording layer 14 is preferably AgInSbTeGe or other phase-change material, and the material used for the first dielectric layer 15 is preferably ZnS—SiO$_2$. The light transmission layer 16 and hard-coat layer 17 are both made of ultraviolet curable resin. In this specification, the layers provided between the substrate 11 and light transmission layer 16 are collectively called the functional layer.

In this preferred embodiment, the pencil hardness of the light transmission layer 16 is set to HB or less. The ultraviolet curable resin making up the light transmission layer 16 is not particularly limited, but an ultraviolet curable resin containing an epoxy acrylate oligomer (difunctional oligomer), multifunctional acrylic monomer, monofunctional acrylic monomer and photopolymerization initiator is preferably used, and by appropriately adjusting the composition, its pencil hardness is set to HB or less.

In addition, in this preferred embodiment, the pencil hardness of the hard-coat layer 17 is set to H or greater. The ultraviolet curable resin making up the hard-coat layer 17 is not particularly limited, but an ultraviolet curable resin containing an epoxy acrylate oligomer (difunctional oligomer), multifunctional acrylic monomer, monofunctional acrylic monomer and photopolymerization initiator is preferably used, and by appropriately adjusting the composition, its pencil hardness is set to H or greater.

Examples of powders that can be used as the inorganic powder include: metals, metal oxides, metal carbonates, metal sulfates, metal nitrides, metal carbides, metal sulfides and the like. More specifically, it is possible to use: α-alumina, β-alumina, γ-alumina, θ-alumina, δ-alumina, nichrome trioxide, α-iron oxide, β-iron oxide, γ-iron oxide, Goethite, metal or alloy magnetic powder, SiO$_2$, ZnO, TiO$_2$, ZrO$_2$, SnO$_2$, silicon nitride, boron nitride, silicon carbide, titanium carbide, molybdenum carbide, boron carbide, tungsten carbide, calcium carbonate, barium carbonate, strontium carbonate, magnesium carbonate, barium sulfide, zinc sulfide, molybdenum disulfide, tungsten disulfide, ITO (tin-doped indium oxide), ATO (antimony-doped tin oxide), artificial diamond, carbon black, or other powder.

In addition, examples of powders that can be used as the organic powder include: acrylic styrene resin powder, benzoguanamine resin powder, melamine resin powder, polyolefin resin powder, polyester resin powder, polyamide resin powder, polyimide resin powder, fluorinated hydrocarbon resin powder, and divinylbenzene resin powder.

The amount of these powders added is preferably 50 wt. % or less. However, if added in large amounts, there is a risk of having deleterious effects on the optical characteristics even if the particle size is made small, so even if the amount of powder added is in the range of 50 wt. % or less, the amount added is preferably determined to be within a range at which the reflectance required in the applicable system does not drop below the required value.

The shape of particles of these powders and their particulate size may be selected appropriately depending on the wavelength of the laser used, amount of powder added, scratch resistance and wear characteristics required of the hard-coat layer, but the particle shape of the powder added is preferably spherical, granular, or polyhedral and the particle size is preferably 100 nm or less, more preferably 1–80 nm, particularly preferably 1–50 nm and most preferably 1–30 nm. In addition, while the particle shape and particle size of the powder added may be either one type or several types, from a standpoint of optical characteristics, the grain size distribution is preferably sharp.

Note that in consideration of the scratch resistance and wear characteristics of the hard coat, it is more preferable to use inorganic powders rather than organic powders. Among the inorganic powders, it is particularly preferable to use one of the aluminas, SiO$_2$, or one of the iron oxides in consideration of the ease of making the particle size within the aforementioned preferable range and the ease of obtaining a sharp grain size distribution.

In addition, as the lubricant it is possible to use fluorinated oil, fatty acids containing fluorine-substituted hydrocarbon groups, fatty acid esters containing fluorine-substituted hydrocarbon groups, ethers containing fluorine-substituted hydrocarbon groups, fatty acids, fatty acid esters, silicone oils, paraffins, fatty acid metal salts, and the like. Lubricants serve the role of increasing the lubricating ability of the surface of the hard-coat layer 17, thus making the surface of the hard-coat layer 17 less susceptible to the formation of scratches.

In addition, as the anti-static agent, various known anti-static agents may be used, e.g. anionic surfactants, cationic surfactants, and the like.

In addition, the dispersant used can be fatty acids containing fluorine-substituted hydrocarbon groups, ethers containing fluorine-substituted hydrocarbon groups, fatty acids, fatty acid metal salts, and the like.

The total content of these lubricants, anti-static agents and dispersants is preferably 0.1–20 wt. % of the inorganic powder or organic powder, more preferably 1–15 wt. % and particularly preferably 1–12 wt. %.

When data is read from an optical recording medium 10 having such a structure, a laser beam set to the playback power level is shined from the hard-coat layer 17 side and the difference in reflected light flux is detected. In addition, when data is written to the optical recording medium 10, a laser beam set to the recording power level is shined from the hard-coat layer 17 side and this changes the state of the recording layer 14 (the crystalline structure of the phase-change film). In such recording/playback of data, the working distance (the distance between the objective lens used to focus the laser beam used in recording/playback and the hard-coat layer 17 which is the incident-light surface of the optical recording medium 10) is set extremely short (e.g., 80–150 $\mu$m), and thus a beam spot diameter much smaller than that in the past is achieved.

In this case, with the optical recording medium 10 according to this preferred embodiment, the hardness of the hard-coat layer 17 which is its incident-light side is sufficiently high, so even in the event that contact occurs between the hard-coat layer 17 of the optical recording medium 10 and the objective lens or the support which supports it, the probability of a fatal scratch occurring on the surface of the hard-coat layer 17 is extremely low. Particularly in the case that the hard-coat layer 17 contains a lubricant, the lubricating ability of the surface is high, so scratches due to such contact can be effectively prevented.

In addition, with the optical recording medium 10 according to this preferred embodiment, the pencil hardness of the light transmission layer 16 is HB or less so warping of the optical recording medium 10 due to cure shrinkage is suppressed, and thus even in the case that data recording/playback is performed using a high-NA lens, highly reliable recording/playback can be performed.

Here follows a description of the method of manufacturing an optical recording medium 10 according to this preferred embodiment.

Figure 2:
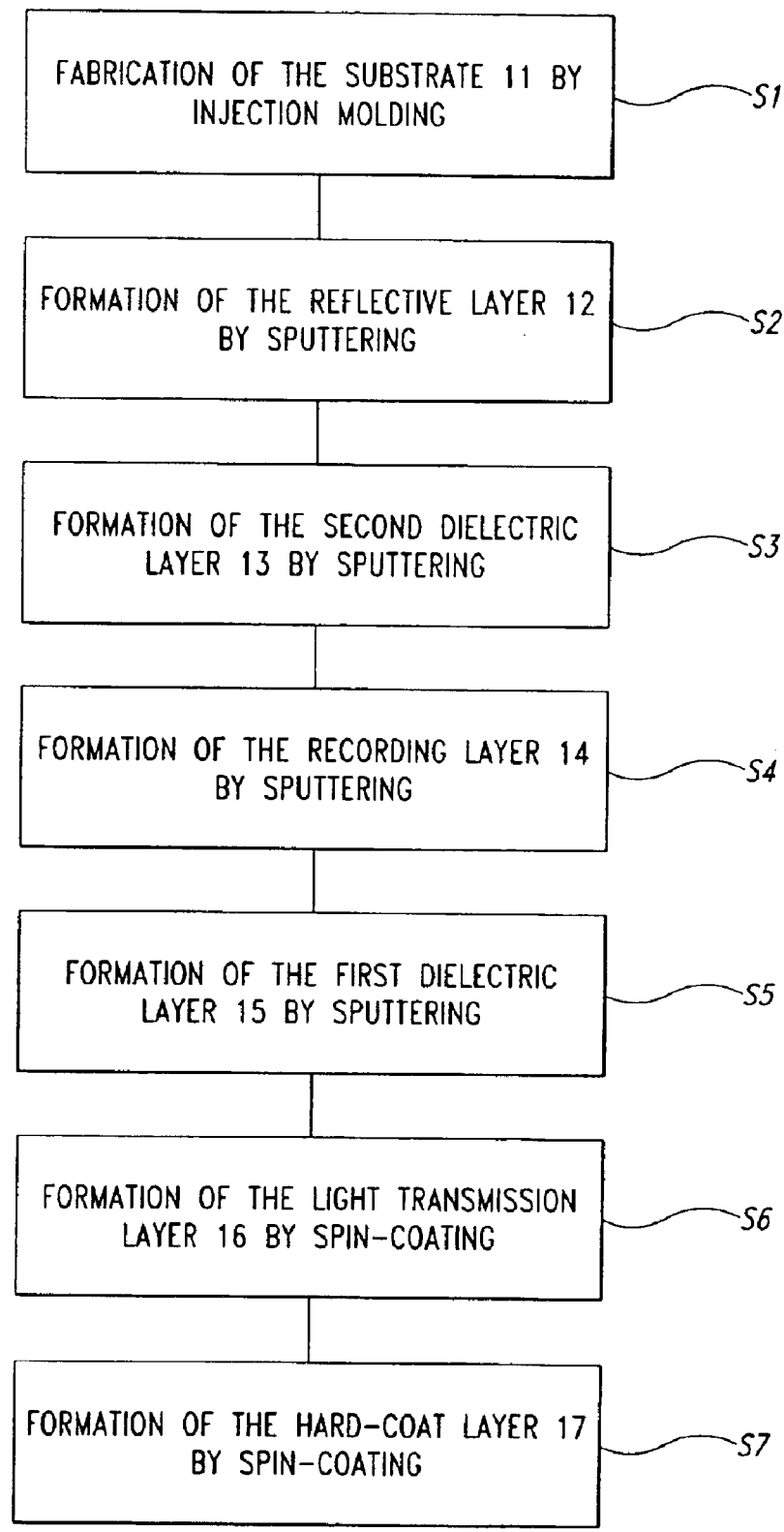
FIG. 2 is a flowchart illustrating a method of manufacturing the optical recording medium 10.
Figure 3:
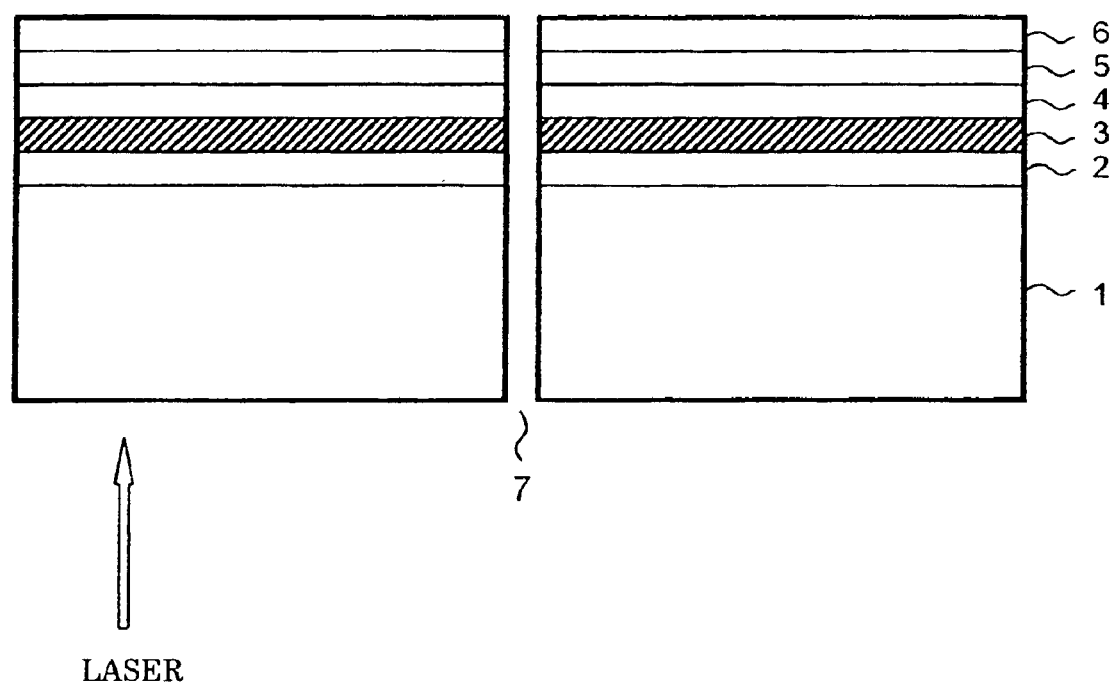
FIG. 3 is a schematic cross section illustrating the structure of a CD-RW.

FIG. 2 is a flowchart illustrating a method of manufacturing the optical recording medium 10. As described above, the thickness of the light transmission layer 16 of the optical recording medium 10 is approximately 100 $\mu$m, so it is extremely thin, and for this reason, film formation is performed in the order opposite that of a typical CD-RW disc in the past.

First, a stamper is used to injection-mold an approximately 1.1 mm-thick substrate 11 with pre-groove having a groove width of 0.15 μm, track pitch of 0.3 μm, and groove depth of approximately 20 nm.

Next, the sputtering method is used to form a film of an alloy having silver as its main constituent upon the surface of the substrate 11 on which the pre-groove is formed (the information area), thus forming a reflective layer 12 with a thickness of 10–300 nm (Step S2). Next, the sputtering method is used to form a film of $Al_2O_3$ upon the upper surface of the reflective layer 12, thus forming a second dielectric layer 13 with a thickness of 10–50 nm (Step S3). Next, the sputtering method is used to form a film of AgInSbTeGe upon the upper surface of the second dielectric layer 13, thus forming a recording layer 14 with a thickness of 5–30 nm (Step S4). Next, the sputtering method is used to form a film of $ZnS$—$SiO_2$ upon the upper surface of the recording layer 14, thus forming a first dielectric layer 15 with a thickness of 30–300 nm (Step S5).

Next, ultraviolet curable resin is spin-coated onto the surface of the first dielectric layer 15 and the surface is exposed to ultraviolet light and cured, thus forming a light transmission layer 16 with a thickness of 50–150 μm (Step S6). Here, it is preferable to use the material described above for the ultraviolet curable resin making up the light transmission layer 16, and it is preferable to use a resin that has cure shrinkage of 7% or less according to the specific gravity method. If the cure shrinkage according to the specific gravity method is 7% or less, then even if the thickness of the ultraviolet curable resin is 50 μm or greater, essentially no warping of the optical recording medium will occur in ultraviolet curing. The pencil hardness after curing of an ultraviolet curable resin that has cure shrinkage according to the specific gravity method of 7% or less is generally HB or less.

Then, a hard-coat liquid consisting of ultraviolet curable resin and solvent is spin-coated onto the surface of the light transmission layer 16, a panel heater is used to evaporate the solvent contained in the hard-coat liquid and then the ultraviolet curable resin is cured by irradiating with ultraviolet light to form a hard-coat layer 17 with a thickness of 0.1–10 μm (Step S7). Here, as the ultraviolet curable resin that makes up the hard-coat layer 17, it is preferable to use the material described above, but it is also preferable to add an inorganic powder or an organic powder as described above. Moreover, it is preferable to add one or two or more of a lubricant, anti-static agent or dispersant. This completes the optical recording medium 10 according to this preferred embodiment.

As described above, an optical recording medium 10 fabricated in this manner has its incident-light surface covered by a very hard hard-coat layer 17 so scratches occurring on the incident-light surface are effectively prevented and the pencil hardness of the light transmission layer 16 is set to HB or less, so warping in the optical recording medium 10 due to cure shrinkage is effectively suppressed.

The present invention is in no way limited to the aforementioned embodiment, but rather various modifications are possible within the scope of the invention as recited in the claims, and these are naturally included within the scope of the invention.

For example, the materials and thicknesses of the various layers making up the optical recording medium 10 illustrated in the aforementioned preferred embodiment are one example of the present invention but the present invention is in no way limited to them. Accordingly, the aforementioned preferred embodiment describes the case of applying the present invention to rewritable optical recording media where the recording layer 14 is made of phase-change materials, but the present invention is also applicable to multisession recordable optical recording media where the recording layer is made of organic dye or the like. In addition, it is also applicable to ROM-type optical recording media where information is stored in pre-pits (pre-recorded pits) formed on the substrate 11 in the manufacturing stage. In other words, the present invention is applicable to any type of optical storage media as long as it is a type of optical storage media wherein ultraviolet curable resin is used as the material for the light transmission layer serving as the light path for the laser beam used in recording or playback. Note that in multisession optical recording media, the reflective layer formed upon the substrate and the recording layer consisting of organic dye or the like comprise the functional layer, but in a ROM-type optical recording medium, the reflective layer formed upon the substrate comprises the functional layer.

As described above, with the present invention, a hard-coat layer is provided on the surface of a light transmission layer 16 with a low pencil hardness and low cure shrinkage, so warping of the optical recording medium 10 can be suppressed while effectively preventing scratches from forming on the surface on the incident-light side. Thus, with the present invention, the quality of types of optical recording media with a thin light transmission layer can be greatly increased.

WORKING EXAMPLE

For use in a light transmission layer, ultraviolet curable resin samples #1 to #4 consisting of an epoxy acrylate oligomer (difunctional oligomer), multifunctional acrylic monomer, monofunctional acrylic monomer and photopolymerization initiator were prepared, each with a different composition.

Next, these samples #1 to #4 were cured by irradiation with ultraviolet light and their pencil hardness and cure shrinkage according to the according to the specific gravity method were measured. The results of measurement are presented in Table 1.

TABLE 1

|  | Sample #1 | Sample #2 | Sample #3 | Sample #4 |
|---|---|---|---|---|
| Pencil hardness | B | HB | H | 2H |
| Cure shrinkage | 4.7% | 6.5% | 7.8% | 8.7% |

As shown in Table 1, samples #1 and #2 which have a pencil hardness of B and HB, respectively, experienced cure shrinkage of 4.7% and 6.5%, respectively. When ultraviolet curable resin having this level of cure shrinkage according to the specific gravity method was used to form a light transmission layer with a thickness of approximately 100 μm, warping of the entire optical storage medium was kept within a range that is negligible in practice. On the other hand, samples #3 and #4 which have a pencil hardness of H and 2H, respectively, experienced cure shrinkage of 7.8% and 8.7%, respectively. When ultraviolet curable resin having such cure shrinkage was used to form a light transmission layer with a thickness of approximately 100 μm, there is a risk of warping of the optical storage medium that is not negligible in practice.

What is claimed is:

1. An optical recording medium comprising a substrate, a functional layer provided upon said substrate, a light transmission layer made of ultraviolet curable resin provided upon said functional layer, and a hard-coat layer provided upon said light transmission layer, wherein the optical recording medium is such that the thickness of said light transmission layer is 50 μm or greater and its pencil hardness is HB or less and the ultraviolet curable resin making up said light transmission layer has cure shrinkage of 7% or less according to the specific gravity method.

2. An optical recording medium in accordance with claim 1, wherein the thickness of said light transmission layer is 150 μm or less.

3. An optical recording medium in accordance with claim 1, wherein the pencil hardness of said hard-coat layer is H or greater.

4. An optical recording medium in accordance with claim 1, wherein said hard-coat layer contains an inorganic powder or an organic powder.

5. An optical recording medium in accordance with claim 4, wherein the average grain size of said inorganic powder or organic powder is 100 nm or less.

6. An optical recording medium in accordance with claim 1, wherein said hard-coat layer contains at least one of a lubricant, anti-static agent, or dispersant.

7. An optical recording medium in accordance with claim 1, wherein said functional layer comprises at least a recording layer containing phase-change material.

8. An optical recording medium comprising a substrate, a functional layer provided upon said substrate, a light transmission layer made of ultraviolet curable resin provided upon said functional layer, and a hard-coat layer provided upon said light transmission layer, wherein the optical recording medium is such that the ultraviolet curable resin making up said light transmission layer has cure shrinkage of 7% or less according to the specific gravity method.

9. An optical recording medium in accordance with claim 8, wherein said functional layer comprises at least a recording layer containing phase-change material.

10. An optical recording medium comprising a substrate, a functional layer provided upon said substrate, a light transmission layer made of ultraviolet curable resin provided upon said functional layer, and a hard-coat layer provided upon said light transmission layer, wherein the optical recording medium is such that said hard-coat layer contains an inorganic powder or an organic powder and the ultraviolet curable resin making up said light transmission layer has cure shrinkage of 7% or less according to the specific gravity method.

11. An optical recording medium in accordance with claim 10, wherein the average grain size of said inorganic powder or organic powder is 100 nm or less.

12. An optical recording medium in accordance with claim 10, wherein said functional layer comprises at least a recording layer containing phase-change material.

13. A method of manufacturing an optical recording medium comprising:

forming a functional layer upon a substrate;

forming a light transmission layer with a thickness of 50 μm or greater and a pencil hardness of HB or less by spin-coating a first ultraviolet curable resin upon said functional layer and irradiating it with ultraviolet light; and forming a hard-coat layer by spin-coating a hard-coat liquid containing a second ultraviolet curable resin upon said light transmission layer and then irradiating it with ultraviolet light, the ultraviolet curable resin making up said light transmission layer has cure shrinkage of 7% or less according to the specific gravity method.

14. A method of manufacturing an optical recording medium in accordance with claim 13, wherein said hard-coat liquid contains inorganic powder or organic powder with an average grain size of 100 nm or less.

* * * * *